United States Patent
Mizoguchi et al.

(10) Patent No.: US 11,358,377 B2
(45) Date of Patent: Jun. 14, 2022

(54) METHOD FOR MANUFACTURING A CHASSIS MEMBER

(71) Applicant: LENOVO (SINGAPORE) PTE. LTD., Singapore (SG)

(72) Inventors: Fumitake Mizoguchi, Kanagawa (JP); Seita Horikoshi, Kanagawa (JP); Tsunenori Yanagisawa, Kanagawa (JP); Takehito Yamauchi, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 187 days.

(21) Appl. No.: 16/661,716

(22) Filed: Oct. 23, 2019

(65) Prior Publication Data

US 2020/0130336 A1    Apr. 30, 2020

(30) Foreign Application Priority Data

Oct. 24, 2018 (JP) .............................. JP2018-199761

(51) Int. Cl.
| | |
|---|---|
| *B32B 27/12* | (2006.01) |
| *B32B 5/02* | (2006.01) |
| *G06F 1/16* | (2006.01) |
| *B32B 27/18* | (2006.01) |
| *B32B 27/06* | (2006.01) |
| *B32B 5/18* | (2006.01) |
| *B32B 5/24* | (2006.01) |
| *B29C 45/00* | (2006.01) |

(Continued)

(52) U.S. Cl.
CPC .............. *B32B 27/12* (2013.01); *B29C 45/00* (2013.01); *B29C 45/16* (2013.01); *B29C 70/345* (2013.01); *B32B 3/02* (2013.01); *B32B 5/02* (2013.01); *B32B 5/18* (2013.01); *B32B 5/245* (2013.01); *B32B 27/065* (2013.01); *B32B 27/18* (2013.01); *G06F 1/1616* (2013.01); *B32B 2260/021* (2013.01); *B32B 2260/046* (2013.01); *B32B 2457/00* (2013.01); *Y10T 428/12389* (2015.01)

(58) Field of Classification Search
CPC . G06F 1/1616; G02F 1/133308; B29C 45/00; B29C 45/16
See application file for complete search history.

(56) References Cited

U.S. PATENT DOCUMENTS

| | | | | |
|---|---|---|---|---|
| 3,466,700 | A | * | 9/1969 | Harrison ............. B29C 45/0416 264/DIG. 83 |
| 2016/0021227 | A1 | * | 1/2016 | Lynch ................. H04M 1/0266 455/566 |
| 2016/0216730 | A1 | * | 7/2016 | Mizoguchi ............ G06F 1/1616 |

FOREIGN PATENT DOCUMENTS

| | | | | |
|---|---|---|---|---|
| CN | 1309821 | A | 8/2001 | |
| CN | 105283005 | * | 1/2016 | ............... G06F 1/16 |

(Continued)

*Primary Examiner* — Alison L Hindenlang
*Assistant Examiner* — Debjani Roy
(74) *Attorney, Agent, or Firm* — Antony P. Ng; Russell Ng PLLC (57) ABSTRACT

A chassis member capable of improving manufacturing efficiency is disclosed. The chassis member includes a laminate in which an interlayer is provided between a pair of fiber-reinforced resin plates made of reinforced fiber impregnated with thermoplastic resin. A frame body formed of thermoplastic resin is joined to an edge of the laminate. The edge of the laminate is provided with a thin plate portion thinner than the other portion. The frame body is joined to the thin plate portion.

5 Claims, 7 Drawing Sheets

(51) Int. Cl.
*B32B 3/02* (2006.01)
*B29C 45/16* (2006.01)
*B29C 70/34* (2006.01)

(56) References Cited

FOREIGN PATENT DOCUMENTS

| | | |
|---|---|---|
| CN | 105283005 A | 1/2016 |
| CN | 105824357 A | 8/2016 |
| JP | 0878184 A | 3/1996 |
| JP | 08078184 A | 3/1996 |
| JP | 2002240188 A | 8/2002 |
| JP | 2012-218363 A | 11/2012 |
| JP | 2012218363 A | 11/2012 |
| JP | 2016-136586 A | 7/2016 |

\* cited by examiner

FIG. 6

METHOD FOR MANUFACTURING A CHASSIS MEMBER

PRIORITY CLAIM

The present application claims benefit of priority under 35 U.S.C. §§ 120, 365 to the previously filed Japanese Patent Application No. JP2018-199761 with a priority date of Oct. 24, 2018, which is incorporated by reference herein.

TECHNICAL FIELD

The present invention relates to chassis members in general, and in particular to a chassis member used in a chassis of an electronic apparatus.

BACKGROUND

Chassis of various electronic apparatuses, such as laptop personal computers (PCs), tablet PCs, and smart phones, are required to be lightweight, thin, and high-strength. Typically, a plate-like fiber-reinforced resin member made of reinforced fiber such as carbon fiber impregnated with matrix resin are be used in the chassis of electronic apparatuses.

For conventional chassis members, thermosetting resin is used in the matrix resin of fiber-reinforced resin plates. Thus, after hardening, it is very difficult to squash the edge of the fiber-reinforced resin plates in order to provide the joint on the edge, which is necessary to form the joint at the same time as formation of the fiber-reinforced resin plates. Therefore, the configuration of a conventional chassis member is low in manufacturing efficiency and mass productivity because it is not possible to use a manufacturing procedure in which, for example, a large-sized laminate is formed, and a set of fiber-reinforced resin plates in the shape of products is cut out from this laminate, and a frame body is then joined to the cut laminate.

Consequently, it would be desirable to provide a chassis member capable of improving the manufacturing efficiency while ensuring the joining strength of a frame body and a laminate.

SUMMARY

In accordance with an embodiment of the present disclosure, a chassis member includes a laminate in which an interlayer is provided between at least a pair of fiber-reinforced resin plates made of reinforced fiber impregnated with thermoplastic resin; and a frame body that is formed of thermoplastic resin, and is joined to an edge of the laminate. The edge of the laminate is provided with a thin plate portion thinner than the other portion, and the frame body is joined to the thin plate portion.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
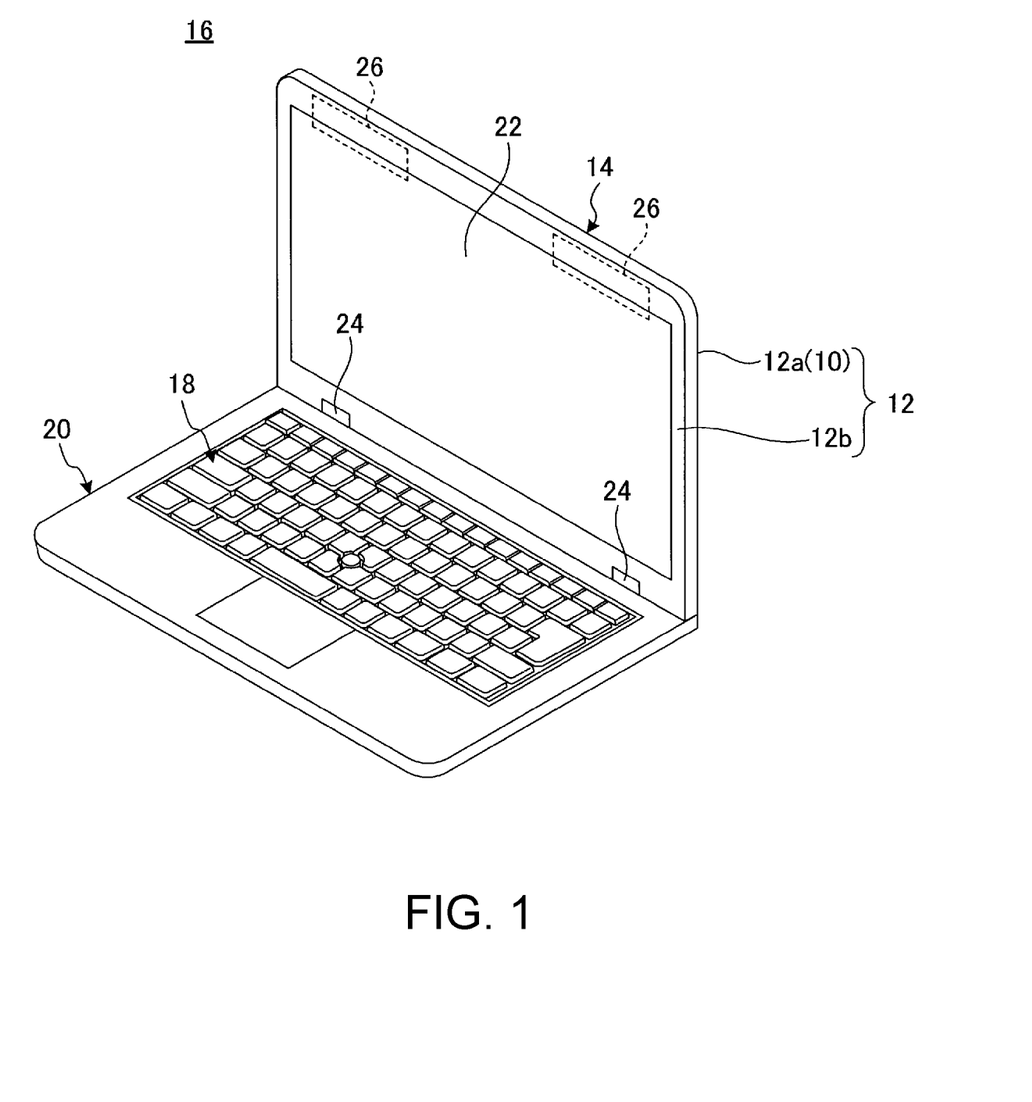
FIG. 1 is a perspective view of an electronic apparatus including a lid body configured of a chassis using a chassis member according to an embodiment.

FIG. 1 is a perspective view of an electronic apparatus 16 including a lid body 14 configured of a chassis 12 using a chassis member 10 according to the embodiment. In the present embodiment, as an example, the chassis 12 formed of the chassis member 10 is used in the lid body 14 of the electronic apparatus 16 that is a laptop PC. The chassis member 10 may be used in chassis of various electronic apparatuses, such as tablet PCs, desktop PCs, and smart phones, besides laptop PCs.

As shown in FIG. 1, the electronic apparatus 16 is a clamshell laptop PC that includes an apparatus body 20 and the rectangular, flat plate-like lid body 14; the lid body 14 is rotatably connected to the apparatus body 20 by right and left hinges 24. The apparatus body 20 includes a keyboard device 18. The lid body 14 includes a display device 22. Various electronic components (not shown), such as a circuit board, an arithmetic processing unit, a hard disk device, and a memory, are housed in the apparatus body 20.

The lid body 14 includes the chassis 12 having a back cover 12a and a front cover 12b. The back cover 12a is a cover member that covers the sides and back of the lid body 14, and is formed of the chassis member 10 according to the present embodiment. The front cover 12b is a plastic cover member that covers the front of the lid body 14 together with the display device 22. A pair of right and left antennas 26 and 26 is provided on near a top end of the inside of the chassis 12. Each antenna 26 is used to send and receive radio waves for wireless communication, etc., and is provided in a position that overlaps with a frame body 36 to be described later.

Figure 2:
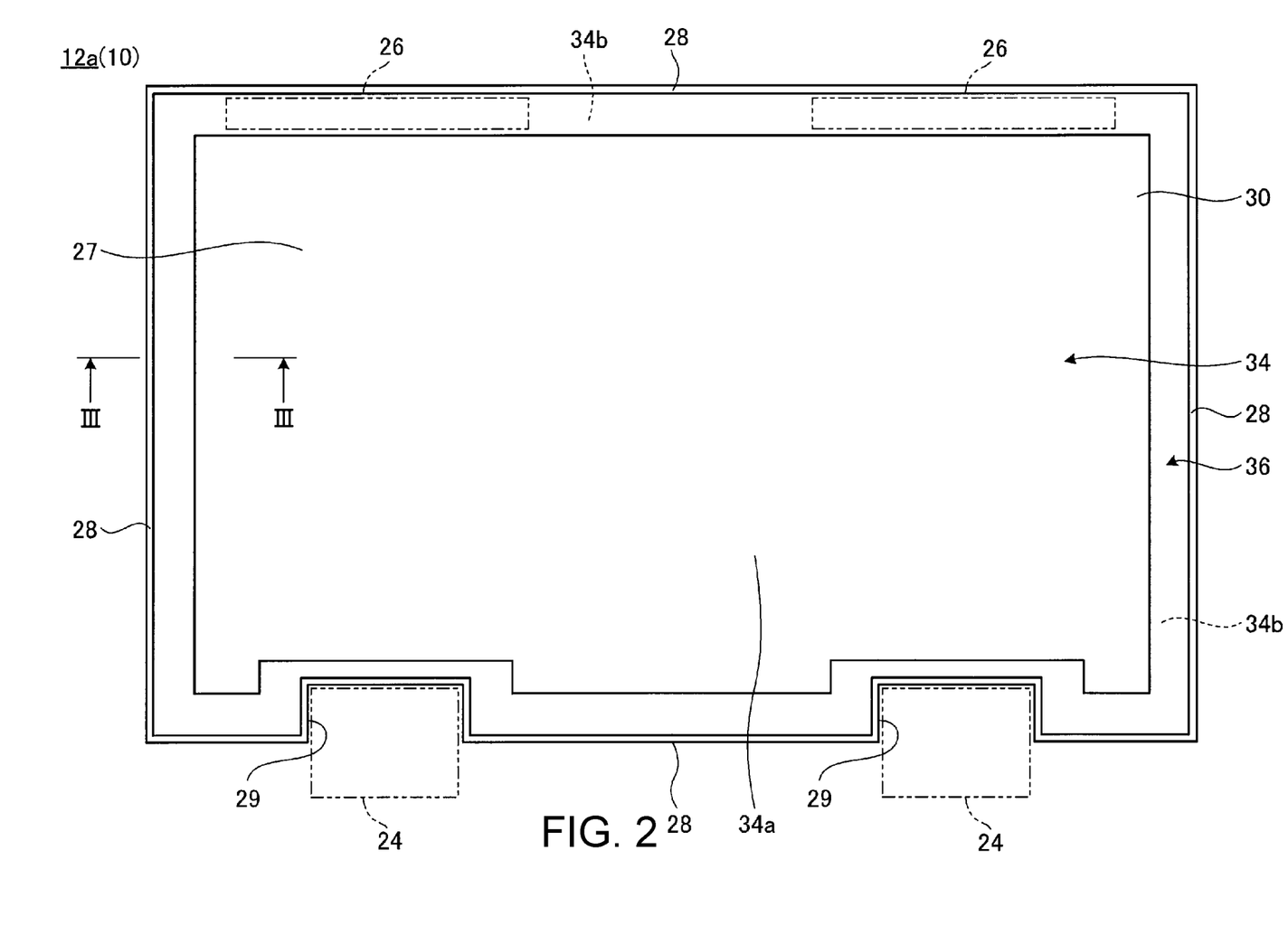
FIG. 2 is a plan view showing a configuration of a back cover.

Subsequently, a configuration of the back cover 12a using the chassis member 10 is described specifically. FIG. 2 is a plan view schematically showing the configuration of the back cover 12a, and is a diagram viewed from the side of an inner surface of the back cover 12a.

As shown in FIG. 2, the back cover 12a is a cover member that a wall portion 28 thereof is provided to stand on the periphery of a backboard 27. The backboard 27 configures the back of the chassis 12. The wall portion 28 configures the four sides of the chassis 12. On the bottom edge of the back cover 12a, a pair of notch-like recessed portions 29 and 29 is provided. A pair of the hinges 24 and 24 is provided in the recessed portions 29 and 29.

Figure 3:
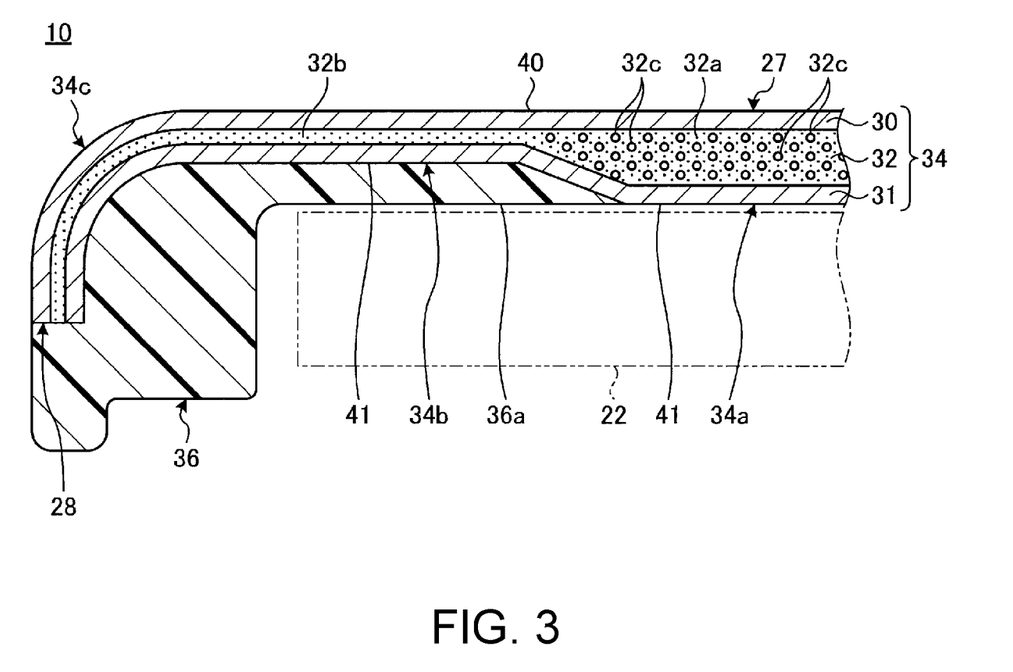
FIG. 3 is a cross-sectional view of the chassis member along a line shown in FIG. 2.

Subsequently, a specific configuration of the chassis member 10 is described. FIG. 3 is a cross-sectional view of the chassis member 10 along a line shown in FIG. 2.

As shown in FIGS. 2 and 3, the chassis member 10 includes a plate-line laminate 34 in which an interlayer 32 is held between a pair of fiber-reinforced resin plates 30 and 31 and the frame body 36 joined to a thin plate portion 34b provided on the peripheral edge of the laminate 34. The laminate 34 has a configuration in which the thin plate portion 34b, which is thinner than a thick plate portion 34a, is provided on the periphery of the thick plate portion 34a constituting the most part of the backboard 27, and the frame body 36 is joined to this thin plate portion 34b.

The fiber-reinforced resin plates 30 and 31 are made of prepreg that contains reinforced fiber impregnated with matrix resin or a laminate of the prepreg. The fiber-reinforced resin plates 30 and 31 in the present embodiment use carbon fiber as the reinforced fiber and thermoplastic epoxy resin as the matrix resin. That is, the fiber-reinforced resin plates 30 and 31 in the present embodiment are so-called carbon fiber reinforced thermo plastics (CFRTP). As the reinforced fiber, various materials other than carbon fiber, for example, metallic fiber such as stainless fiber, inorganic fiber such as glass fiber, etc. may be used.

Thermoplastic resin forming the matrix resin includes, for example, polyolefin such as thermoplastic epoxy resin, polyethylene (PE), polypropylene (PP), and polybutylene, styrene-based resin such as polystyrene (PS), acrylonitrile-butadiene-styrene copolymer (ABS), and acrylonitrile-styrene copolymer (AS), polyester such as polyethylene terephthalate (PET), polybutylene terephthalate (PBT), polytrimethylene terephthalate (PTT), polyethylene naphthalate (PEN), and liquid crystalline polyester, fluorine-based resin such as polyoxymethylene (POM), polyamide (PA), polycarbonate (PC), polymethyl methacrylate (PMMA), polyvinyl chloride (PVC), polyphenylene sulfide (PPS), polyphenylene ether (PPE), modified PPE, thermoplastic polyimide (PI), polyamide-imide (PAI), polyetherimide (PEI), polysulfone (PSU), modified PSU, polyether sulfone (PES), polyketone (PK), polyether ketone (PEK), polyetheretherketone (PEEK), polyether ketone ketone (PEKK), polyarylate (PAR), polyether nitrile (PEN), thermoplastic phenolic-based resin, phenoxy resin, epoxy resin, and polytetrafluoroethylene (PTFE), thermoplastic elastomer such as polystyrene series, polyolefin series, polyurethane series, polyester series, polyamide series, polybutadiene series, polyisoprene series, and fluorine series, etc., and copolymers and modified forms of these, mixtures of two or more of these, and polymer alloy.

In general, epoxy resin is a typical material of thermosetting resin; however, there is thermoplastic epoxy resin that exhibits thermoplasticity idiosyncratically after hardened by a special catalyst and has high resistance to impact and high toughness. Therefore, the fiber-reinforced resin plates 30 and 31 in the present embodiment use carbon fiber impregnated with thermoplastic epoxy resin.

The interlayer 32 is a soft spacer that is provided between the fiber-reinforced resin plates 30 and 31 to leave a space between them. By providing the interlayer 32, the section modulus of the laminate 34 in a plate thickness direction is increased, and a lightweight and high-strength structure is obtained. As shown in FIG. 3, the interlayer 32 includes a foam layer portion 32a provided in a position corresponding to the thick plate portion 34a of the laminate 34 and a compressed layer portion 32b provided in a position corresponding to the thin plate portion 34b of the laminate 34.

In the foam layer portion 32a, a bead-like foam material 32c is added to a resin material that is a base material. In a case of the present embodiment, the foam material 32c is foam glass beads that are thin glass beads with air filled in their internal space. The compressed layer portion 32b has a same structure as the foam layer portion 32a except that the glass beads are squashed, and is formed mostly of only the resin material that is a base material because the foam material 32c is squashed unlike the foam layer portion 32a. The resin material forming the foam layer portion 32a and the compressed layer portion 32b may be similar thermoplastic resin to the above-described matrix resin of the fiber-reinforced resin plates 30 and 31.

As shown in FIG. 3, in the present embodiment, a portion of the laminate 34 from the thick plate portion 34a to a part of the thin plate portion 34b extends like a flat plate along an outer surface 40 of the chassis member 10 (the back cover 12a), and configures the backboard 27 of the back cover 12a. The laminate 34 has a bent portion 34c bent to the side of an inner surface 41 on the edge of the thin plate portion 34b. The bent portion 34c configures the wall portion 28 of the back cover 12a. The fiber-reinforced resin plate 30 on the side of the outer surface 40 extends flatly along the outer surface 40 up to the bent portion 34c. The fiber-reinforced resin plate 31 on the side of the inner surface 41 is bent to be inclined in a direction of gradually coming closer to the fiber-reinforced resin plate 30 at the boundary between the thick plate portion 34a and the thin plate portion 34b. A portion of the fiber-reinforced resin plate 31 corresponding to the thick plate portion 34a and the thin plate portion 34b extends along the inner surface 41 and parallels the fiber-reinforced resin plate 30.

As shown in FIGS. 2 and 3, the frame body 36 is joined to the inner surface 41 of the thin plate portion 34b including the bent portion 34c of the laminate 34. The frame body 36 is formed of injection-molded thermoplastic resin. The thermoplastic resin forming the frame body 36 may be similar one to the above-described matrix resin of the fiber-reinforced resin plates 30 and 31; for example, glass fiber reinforced plastics (GFRP) that is thermoplastic resin containing reinforced plastics such as glass fiber may be used.

The frame body 36 is provided to be in contact with the inner surface 41 of the thin plate portion 34b recessed from the thick plate portion 34a of the laminate 34 to the side of the outer surface 40. A surface 36a of the frame body 36 is set to be on the same level as the inner surface 41 of the thick plate portion 34a. The surface 36a of the frame body 36 may be set in a position recessed lower to the side of the outer surface 40 than the inner surface 41 of the thick plate portion 34a. As a result, as indicated by an alternate long and two short dashes line in FIG. 3, the edge of the display device 22 does not interfere with the surface 36a of the frame body 36. Thus, the display device 22 can be disposed in a position closer to or in contact with the inner surface 41, and contributes to making the lid body 14 thinner.

The frame body 36 is provided to fill a space of the recess of the thin plate portion 34b from the thick plate portion 34a in this way, and is joined to the laminate 34 on a larger contact area (joining area). Thus, the laminate 34 and the frame body 36 are joined with high joining strength.

Figure 4A:
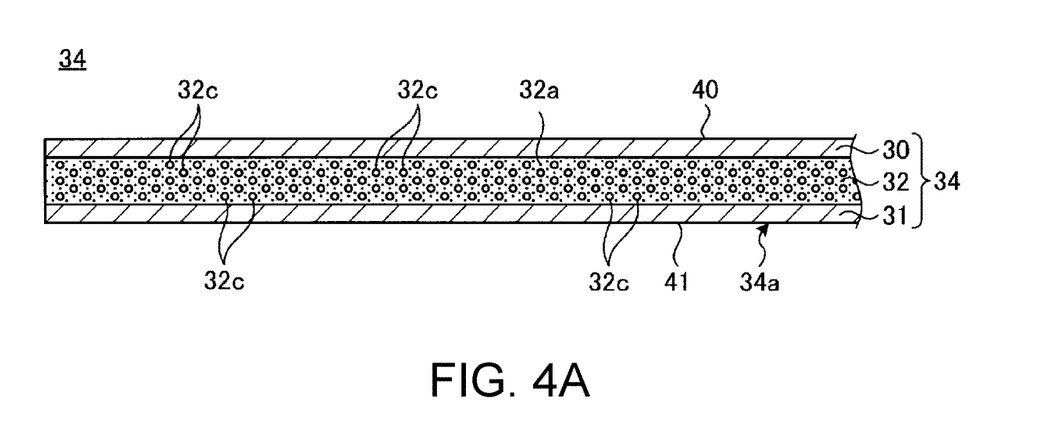
FIG. 4A is a cross-sectional view of a laminate before a frame body is joined thereto.
Figure 4B:
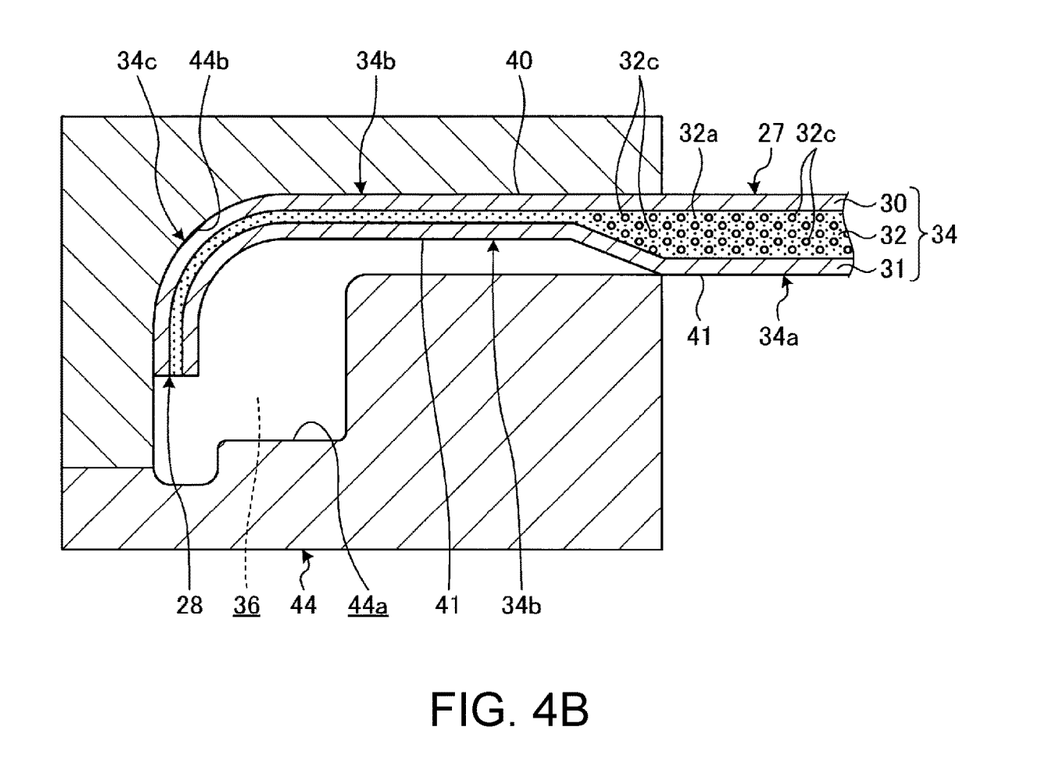
FIG. 4B is a cross-sectional view for explaining a process of joining the frame body to the laminate shown in FIG. 4A.

Subsequently, an example of a method for manufacturing the chassis member 10 is described. FIG. 4A is a cross-sectional view of the laminate 34 before the frame body 36 is joined thereto. FIG. 4B is a cross-sectional view for explaining a process of joining the frame body 36 to the laminate 34 shown in FIG. 4A.

As shown in FIG. 4A, the fiber-reinforced resin plates 30 and 31 having, for example, a shape corresponding to the backboard 27 of the back cover 12a are formed, and the laminate 34 in which the interlayer 32 is held between the fiber-reinforced resin plates 30 and 31 and pressed in a lamination direction is formed. This laminate 34 is entirely formed of the thick plate portion 34a, and is not provided with the thin plate portion 34b. The laminate 34 shown in FIG. 4A is the one obtained in such a manner that, for example, a large-sized laminate having the same cross-sectional structure as this is formed, and the laminate 34 is cut out from the large-sized laminate.

Subsequently, as shown in FIG. 4B, the laminate 34 is set in a mold 44, and molten thermoplastic resin is injected from an inlet (not shown) into a cavity space 44a, thereby this thermoplastic resin is injection-molded so as to be in contact with the inner surface 41 of the thin plate portion 34b of the laminate 34. It is to be noted that a curved surface 44b that allows the bent portion 34c to be formed on the laminate 34 is provided in the cavity space 44a of the mold 44. Thus, the edge of the laminate 34 is pressed and heated by the thermoplastic resin injected into the cavity space 44a and also compressed by the mold 44.

Here, respective base materials of the fiber-reinforced resin plates 30 and 31 and the interlayer 32 of the laminate 34 are all formed of thermoplastic resin, and therefore are softened by the application of heat. Then, at the edge of the laminate 34, the interlayer 32 is squashed between the fiber-reinforced resin plates 30 and 31, and the fiber-reinforced resin plate 31 is deformed, thereby the thin plate portion 34b and the bent portion 34c are formed. At that time, in the interlayer 32 of the thin plate portion 34b, the foam material 32c is broken and squashed. At the same time, the resin base material of the interlayer 32 is compressed between the fiber-reinforced resin plates 30 and 31, and some of the resin material forms the compressed layer portion 32b, and the other is pushed out to the side of the foam layer portion 32a or the side of the cavity space 44a. As a result, the frame body 36 is joined to the laminate 34, and, at the same time, the thin plate portion 34b and the bent portion 34c are formed, thus the manufacture of the chassis member 10 is completed.

Figure 5A:
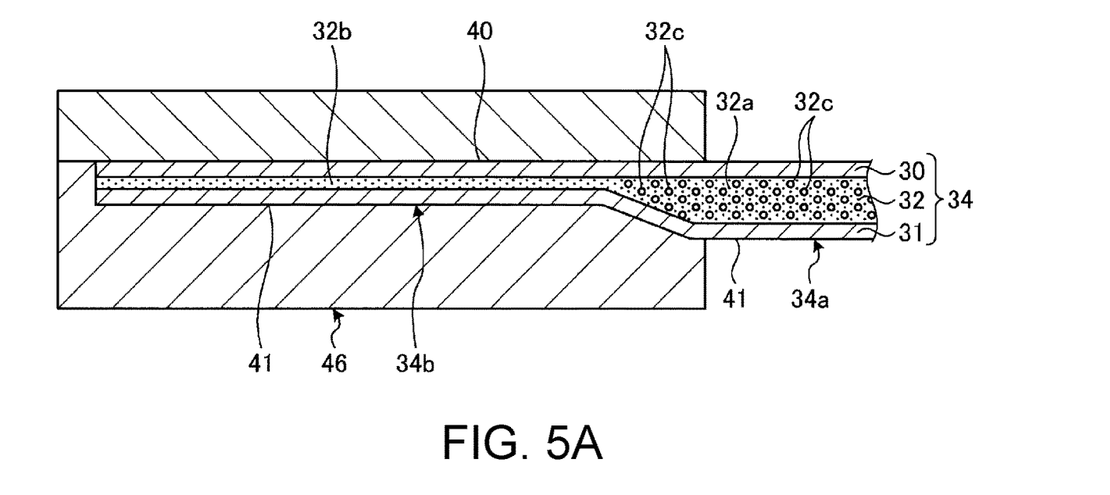
FIG. 5A is a cross-sectional view for explaining a process of forming a thin plate portion on an edge of the laminate.
Figure 5B:
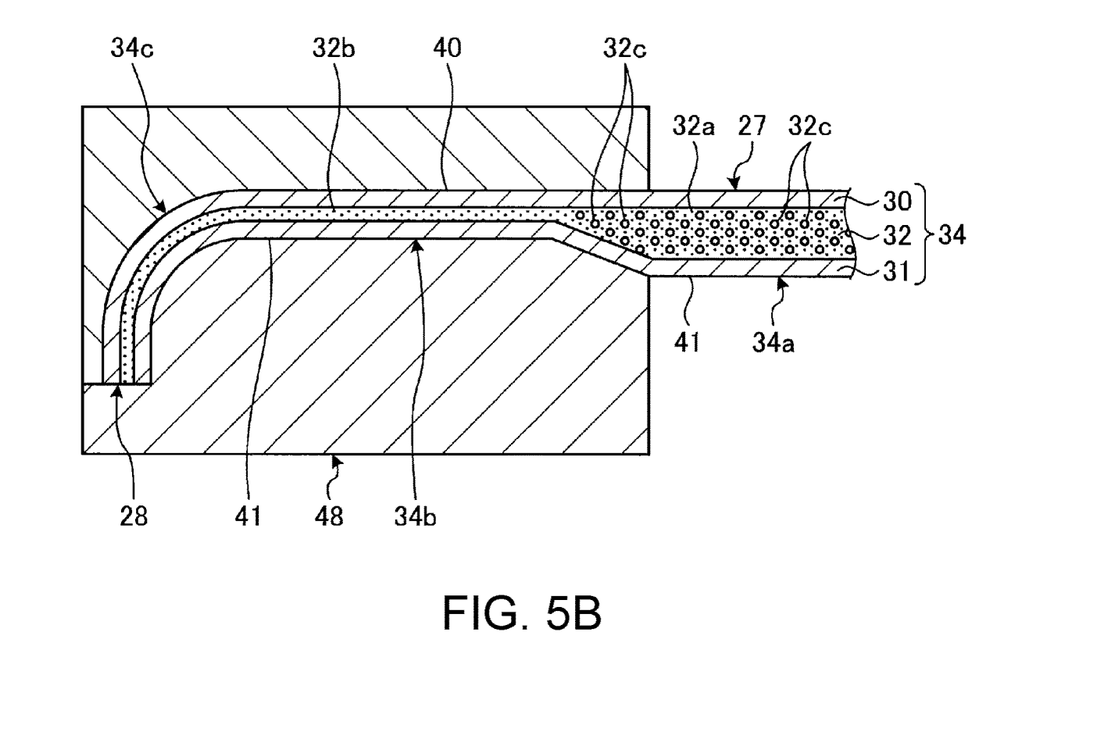
FIG. 5B is a cross-sectional view for explaining a process of forming a bent portion on the edge of the laminate shown in FIG. 5A.
Figure 5C:
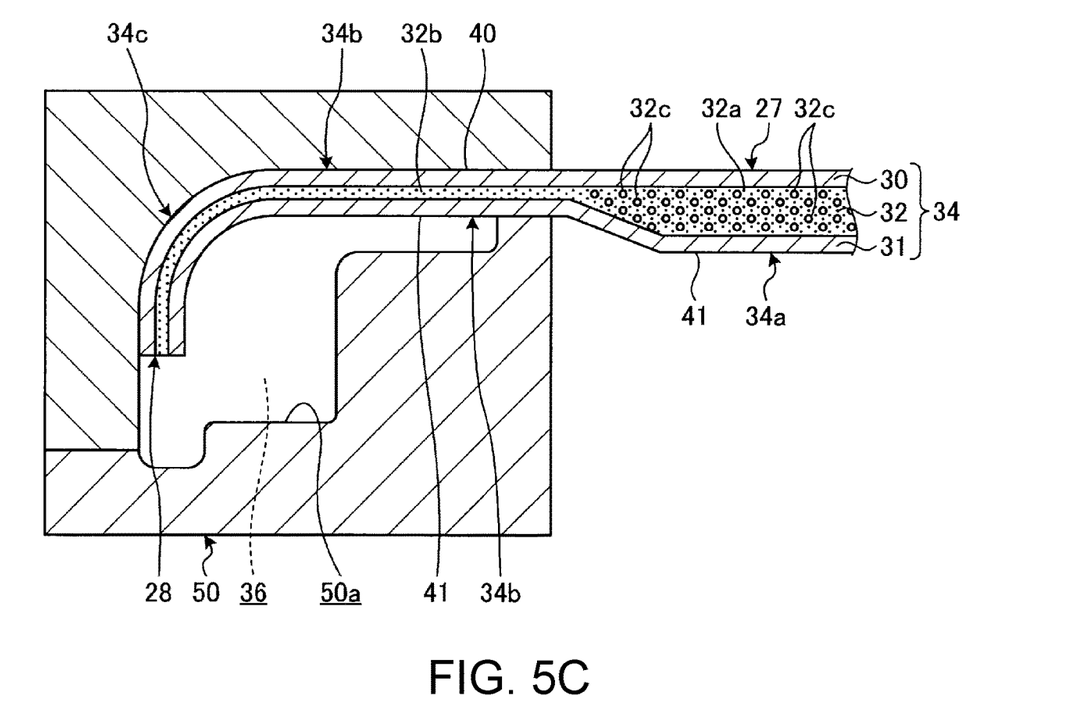
FIG. 5C is a cross-sectional view for explaining a process of joining the frame body to the laminate shown in FIG. 5B.
Figure 5D:
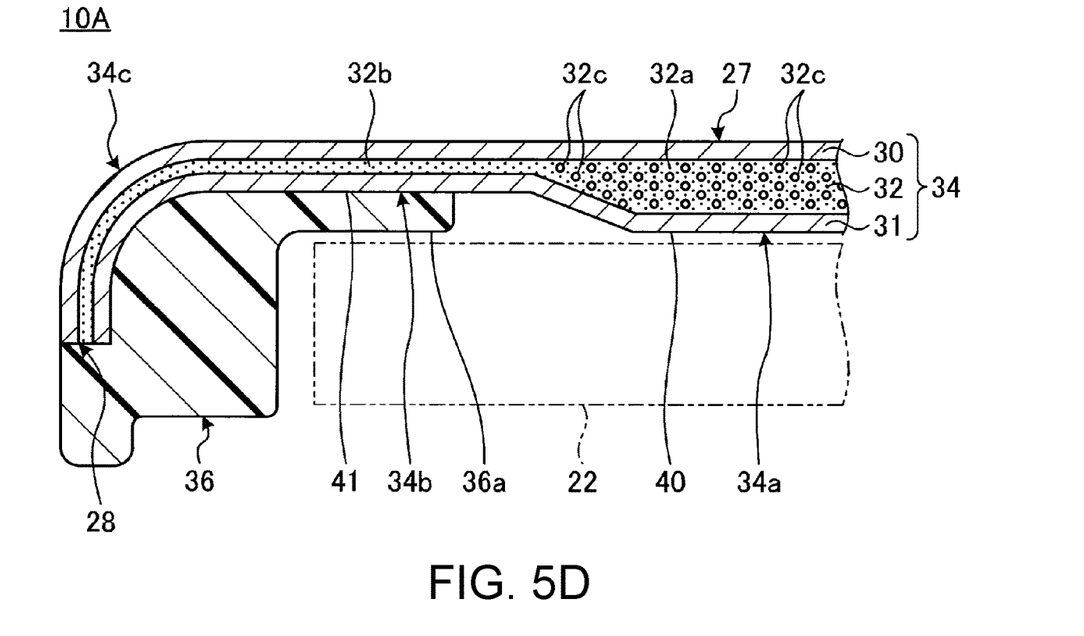
FIG. 5D is a cross-sectional view of a main section of a chassis member manufactured through the manufacturing processes shown in FIGS. 5A-5C.

Subsequently, an example of another method for manufacturing the chassis member 10 is described. FIG. 5A is a cross-sectional view for explaining a process of forming the thin plate portion 34b on the edge of the laminate 34. FIG. 5B is a cross-sectional view for explaining a process of forming the bent portion 34c on the edge of the laminate 34 shown in FIG. 5A. FIG. 5C is a cross-sectional view for explaining a process of joining the frame body 36 to the laminate 34 shown in FIG. 5B. FIG. 5D is an enlarged cross-sectional view of a main section of a chassis member 10A manufactured through the manufacturing processes shown in FIGS. 5A to 5C.

Also in this manufacturing method, first, the laminate 34 shown in FIG. 4A is formed. Then, as shown in FIG. 5A, the laminate 34 is set in a mold 46, and thermoplastic resin forming the laminate 34 is softened by heating and pressing the edge of the laminate 34, thereby the thin plate portion 34b is formed on the edge. That is, when the thin plate portion 34b is formed on the edge of the laminate 34, the interlayer 32 is squashed between the fiber-reinforced resin plates 30 and 31, and the foam material 32c is broken, and, as a result, the thin plate portion 34b provided with the compressed layer portion 32b is formed on the edge of the laminate 34. Then, as shown in FIG. 5B, the laminate 34 provided with the thin plate portion 34b is set in another mold 48, and the thermoplastic resin forming the laminate 34 is softened by heating and pressing the thin plate portion 34b, thereby the bent portion 34c is formed on the edge.

Next, as shown in FIG. 5C, the laminate 34 provided with the thin plate portion 34b and the bent portion 34c is set in still another mold 50, and molten thermoplastic resin is injected from an inlet (not shown) into a cavity space 50a. That is, thermoplastic resin is injection-molded so as to be in contact with the inner surface 41 of the thin plate portion 34b of the laminate 34. This joins the frame body 36 to the laminate 34, thus the manufacture of the chassis member 10A is completed (see FIG. 5D). Also in this manufacturing method, for example, the processes of forming the thin plate portion 34b and the bent portion 34c shown in FIGS. 5A and 5B may be performed simultaneously. Furthermore, for example, the processes of forming the thin plate portion 34b, the bent portion 34c and the frame body 36 shown in FIGS. 5B and 5C may be performed simultaneously.

It is to be noted that FIG. 5D illustrates a configuration in which the frame body 36 is not in contact with a portion of the inner surface 41 of the thin plate portion 34b; however, as with the chassis member 10 shown in FIG. 3, the chassis member 10A may also have a configuration in which the frame body 36 is in contact with the entire inner surface 41 of the thin plate portion 34b. Conversely, the chassis member 10 shown in FIG. 3 may have a configuration in which the frame body 36 is not in contact with a portion of the inner surface 41 of the thin plate portion 34b.

As described above, in the chassis member 10 (10A) according to the present embodiment, the thin plate portion 34b thinner than the other portion is provided on the edge of the laminate 34, and the frame body 36 is joined to this thin plate portion 34b.

Therefore, in the chassis member 10 (10A), the contact area of the frame body 36 with the laminate 34 is large, and the joining strength of the two is high. Besides, in the chassis member 10 (10A), thermoplastic resin is used in the matrix resin of the fiber-reinforced resin plates 30 and 31 included in the laminate 34. Thus, as in the respective manufacturing methods described above, even if the laminate 34 not provided with the thin plate portion 34b shown in FIG. 4A is manufactured in advance, the thin plate portion 34b and the bent portion 34c can be easily formed on the edge of the laminate 34 in a post-process. Moreover, at the same time as one or both of the processes of forming the thin plate portion 34b and the bent portion 34c, the frame body 36 can be joined; therefore, high manufacturing efficiency is achieved. In particular, in the manufacturing method shown in FIGS. 4A and 4B, by utilizing heat and pressure at the time of injection molding of the frame body 36, the thin plate portion 34b and the bent portion 34c are simultaneously formed on the edge of the laminate 34. Thus, the manufacturing efficiency is further improved.

In the chassis member 10 (10A), the interlayer 32 added with the bead-like foam material 32c is used in the resin material. Thus, when the interlayer 32 is heated at the time of formation of the thin plate portion 34b, the foam material 32c can be maintained in a stable state with little expansion, etc. due to the application of heat, and the foam layer portion 32a and the compressed layer portion 32b are each stable in a desired shape. In particular, in the present embodiment, foam glass beads are used as the foam material 32c; therefore, the stability of the foam material 32c when heated is even more high, and the foam material 32c is certainly squashed when compressed, and the thin plate portion 34b can be formed. Furthermore, if the foam material 32c of the compressed layer portion 32b is certainly squashed, the inside of the compressed layer portion 32b is only the resin base material, and thus is made hard. Then, the resin material forming the frame body 36 is prevented from entering from an end surface of the edge into the compressed layer portion 32b, and the shape of the interlayer 32 including the compressed layer portion 32b is further stabilized. It is to be noted that in a case where the foam material 32c is formed of not bead-like but porous resin material including a mere air layer, when the foam material 32c is heated to be squashed, the air layer is not stable, and is expanded and contracted, which may cause shape defects, etc. of the foam layer portion 32a and the compressed layer portion 32b after molding.

Figure 6:
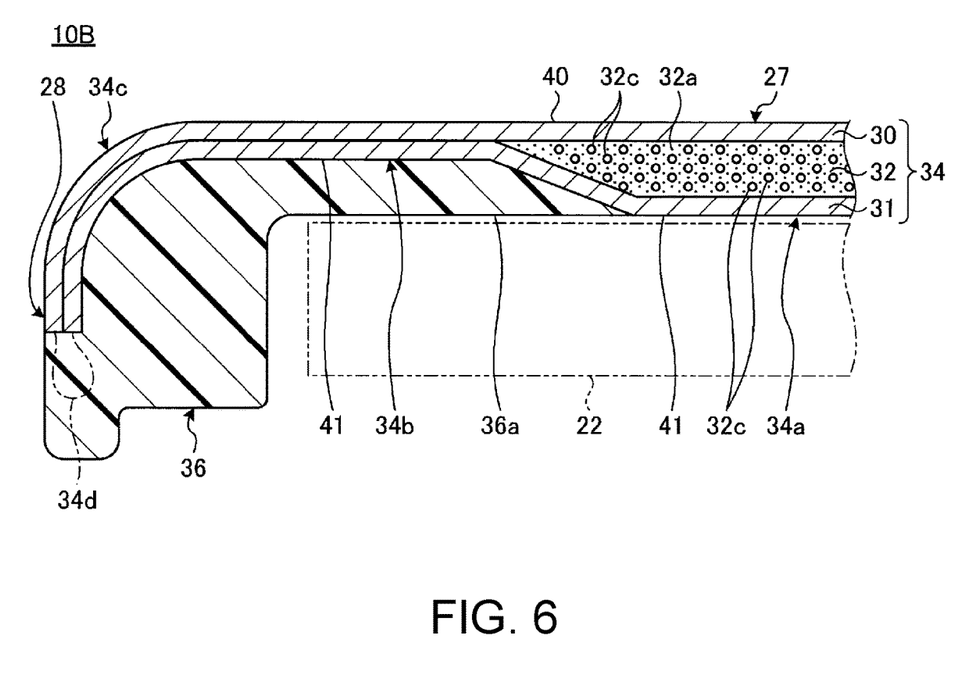
FIG. 6 is a cross-sectional view of a main section of a chassis member according to another modification example.

FIG. 6 is an enlarged cross-sectional view of a main section of a chassis member 10B according to another modification example. As shown in FIG. 6, in this chassis member 10B, the interlayer 32 is not provided in the thin plate portion 34b, as compared with the chassis members 10 and 10A shown in FIGS. 3 and 5D. That is, in at least a part of the thin plate portion 34b of the chassis member 10B, the fiber-reinforced resin plates 30 and 31 are in close contact with each other, and the compressed layer portion 32b is not provided (the laminate 34 has no interlayer). The thin plate portion 34b of this chassis member 10B is thinner than those of the above-described chassis members 10 and 10A, thus the strength of the thin plate portion 34b is inferior; however, the chassis member 10B has the advantage of being easy to manufacture because it is not necessary to control the thickness of the thin plate portion 34b. The chassis member 10B may have a configuration in which only a portion of its edge is not provided with the compressed layer portion 32b, and the other portion is provided with the compressed layer portion 32b just like the above-described chassis members 10 and 10A.

A resin material 34d indicated by an alternate long and two short dashes line in FIG. 6 is the base material of the interlayer 32 seeping out from between the fiber-reinforced resin plates 30 and 31 at the time of molding. It doesn't matter to the chassis member 10B (10, 10A) if the resin material 34d seeps out of the laminate 34 in this way and configures a part of the frame body 36.

It is to be noted that needless to say, the present invention is not limited to the above-described embodiment, and modifications can be freely made without departing from the scope of the present invention. For example, in the above-described embodiment, there is provided an example where the chassis member 10 (10A, 10B) is used as the chassis 12 of the lid body 14 included in the electronic apparatus 16; however, the chassis member 10 may be used in the apparatus body 20.

As has been described, the present invention provides a chassis member used in a chassis of an electronic apparatus.

While the invention has been particularly shown and described with reference to a preferred embodiment, it will be understood by those skilled in the art that various changes in form and detail may be made therein without departing from the spirit and scope of the invention.

What is claimed is:

1. A method comprising:
providing an interlayer between a pair of fiber-reinforced resin plates made of reinforced fiber impregnated with thermoplastic resin for manufacturing a laminate;
after said laminate has been disposed inside a mold, injecting thermoplastic resin into a cavity space of said mold;
pressing and heating an edge of said laminate by said injected thermoplastic resin to form a thin plate portion thinner than another portion on said edge of said laminate; and
joining a frame body formed of said injected thermoplastic resin to said thin plate portion.

2. The method of claim 1, further comprising forming a bent portion on said edge when said edge of said laminate is pressed and heated.

3. A method comprising:
providing an interlayer between a pair of fiber-reinforced resin plates made of reinforced fiber impregnated with thermoplastic resin for manufacturing a laminate;
after said laminate has been disposed inside a first mold, pressing and heating an edge of said laminate to form a thin plate portion thinner than another portion; and
after said laminate formed with said thin plate portion is disposed inside a second mold, injecting thermoplastic resin into a cavity space of said second mold; and
joining a frame body formed of said injected thermoplastic resin to said thin plate portion.

4. The method of claim 3, wherein said pressing and heating further includes pressing and heating an edge of said laminate to form a thin plate portion, including a thin interlayer portion formed from said interlayer portion, thinner than another portion.

5. The method of claim 1, wherein said pressing and heating further includes pressing and heating an edge of said laminate to form a thin plate portion, including a thin interlayer portion formed from said interlayer portion, thinner than another portion.

* * * * *